(No Model.) 7 Sheets—Sheet 1.

H. R. TRACY.
LOOP TAKER AND ACTUATING MECHANISM THEREFOR.

No. 470,796. Patented Mar. 15, 1892.

Witnesses
John Davirie
E. H. Parry

Inventor
Harriet Ruth Tracy.
By her Attorney,
R. S. Dyrenforth.

(No Model.) 7 Sheets—Sheet 3.

H. R. TRACY.
LOOP TAKER AND ACTUATING MECHANISM THEREFOR.

No. 470,796. Patented Mar. 15, 1892.

Witnesses

Inventor
Harriet Ruth Tracy,
By her Attorney,

(No Model.) 7 Sheets—Sheet 4.

H. R. TRACY.
LOOP TAKER AND ACTUATING MECHANISM THEREFOR.

No. 470,796. Patented Mar. 15, 1892.

Witnesses
John Davisie
E. H. Parry

Inventor
Harriet Ruth Tracy,
By her Attorney,
R. S. Dyrenforth.

(No Model.)  7 Sheets—Sheet 5.

H. R. TRACY.
LOOP TAKER AND ACTUATING MECHANISM THEREFOR.

No. 470,796. Patented Mar. 15, 1892.

Witnesses
John Imrie
E. L. Parry

Inventor
Harriet Ruth Tracy,
By her Attorney,
R. S. Dyrenforth.

THE NORRIS PETERS CO., PHOTO-LITHO., WASHINGTON, D. C.

(No Model.) 7 Sheets—Sheet 6.

H. R. TRACY.
LOOP TAKER AND ACTUATING MECHANISM THEREFOR.

No. 470,796. Patented Mar. 15, 1892.

Witnesses
John Irwin
E. H. Parry

Inventor
Harriet Ruth Tracy,
By her Attorney,
R. S. D'Yenforth.

THE NORRIS PETERS CO., PHOTO-LITHO., WASHINGTON, D. C.

(No Model.) 7 Sheets—Sheet 7.

H. R. TRACY.
LOOP TAKER AND ACTUATING MECHANISM THEREFOR.

No. 470,796. Patented Mar. 15, 1892.

Witnesses
John Jairie
E. H. Parry

Inventor
Harriet Ruth Tracy,
By her Attorney,
R. S. Dyrenforth.

UNITED STATES PATENT OFFICE.

HARRIET RUTH TRACY, OF NEW BRIGHTON, NEW YORK.

LOOP-TAKER AND ACTUATING MECHANISM THEREFOR.

SPECIFICATION forming part of Letters Patent No. 470,796, dated March 15, 1892.

Application filed December 8, 1891. Serial No. 414,414. (No model.)

*To all whom it may concern:*

Be it known that I, HARRIET RUTH TRACY, a citizen of the United States, residing at New Brighton, in the county of Richmond and State of New York, have invented certain new and useful Improvements in Sewing-Machines; and I do hereby declare the following to be a full, clear, and exact description of the invention, such as will enable others skilled in the art to which it appertains to make and use the same.

This invention relates to sewing-machines.

The object of the invention is to produce a sewing-machine in which the loop-taker shall be capable of acting in and of itself as a take-up, thus obviating necessity of a separate take-up device.

With this object in view the invention consists, primarily, in a revoluble loop-taker provided with openings in its periphery, forming opposing hooks, the openings to serve to retain the needle-thread upon the loop-taker for carriage of the loop of the needle-thread entirely around it and to keep the thread from contact with the driving-wheel and the opposing hooks to serve to take and take up the thread, the loop-taker to be suitably supported and combined with a driving device gearing with, taking against, or in any other suitable manner engaging its periphery, so that positive and accurately-timed movement may be given to the loop-taker; furthermore, in a sewing-machine comprising a revoluble loop-taker provided with openings in its periphery forming opposing hooks, a driving device, and stop mechanism whereby motion having been imparted to the loop-taker it is caused to stop at predetermined points; furthermore, in a sewing-machine comprising a revoluble loop-taker provided with openings in its periphery forming opposing hooks, the loop-taker being suitably supported and combined with driving mechanism and with a reversible feeding device, whereby the fabric under operation may be moved in either of two directions; furthermore, in a revoluble loop-taker provided with openings in its periphery forming opposing hooks, the loop-taker having a chamber for thread-supply to present a shuttle, said shuttle to be suitably supported and combined with a peripheral driving device; furthermore, in a revoluble loop-taker provided with openings in its periphery forming opposing hooks, the loop-taker being provided with an internal chamber containing a spool or bobbin forming a shuttle and the spool or bobbin having a surrounding band of spring metal with openings in its ends, the thread of the spool or bobbin passing through one or more of the openings, whereby a tension is placed on the thread, and, finally, in various novel details of construction whereby the object of the invention is attained.

In the accompanying drawings, illustrating some forms of embodiment of the invention, Fig. 11 is a side view of the spool or bobbin with the improved tension device placed upon it.

In the drawings, A represents the main driving-shaft of the machine, on which is placed a belt or other wheel $A^2$, which receives motion from any suitable source, such as a treadle, motor, or the like. Motion from the driving-shaft is communicated to the needle-bar and to the shuttle in any suitable well-known way to cause two reciprocations of the needle-bar to each complete revolution of the loop-taker.

One way of driving the loop-taker is shown in the accompanying drawings. A large gear-wheel B of suitable size and fixed upon the driving-shaft back of the loop-taker has at each side of it and supported in hangers $b$ on shafts $b^2$ gear-wheels $B^2$ of one-half the diameter of the gear-wheel B and meshing with this wheel, while mounted loosely on the outer ends of the shafts $b^2$ are gear-wheels $B^3$ of the same diameter as the loop-taker. Interposed between each of the gear-wheels $B^2$ and a gear-wheel $B^3$ is the mechanism whereby the gear-wheels $B^3$ are given motion from the shafts $b^2$ and are stopped twice during each complete revolution of the shafts. This mechanism comprises a wheel C, fixed upon the shaft $b^2$ and carrying on its inner face a rigid pin $c$, upon which slides a plate $c^2$, carrying a pin $c^3$, which is capable of sliding through a hole in the wheel C to project from the front face thereof or to be withdrawn to a position bringing its end flush with the outer face of the wheel. The upper portion of the plate $c^2$ projects a short distance above the pin $c^3$, and this projection enters grooves $d$ in plates D on the hangers as the wheel C revolves. The grooves $d$ are so formed that as the pins $c^3$ are moved by the wheel C said grooves will cause these pins to move into one of the curved slots $b^3$ of the gear-wheels $B^3$ at the time when the needle of the machine, through suitable intermediate mechanism, is at a position to to present the loop of the needle-thread carried thereby to one of the hooks of the loop-taker. The pins $c^3$, entering the slots $b^3$, turn the wheels $B^3$ around half a revolution, when the pins are withdrawn and pass through the space between the plates D before they are again brought into engagement with the gear-wheels $B^3$. The peripheries of the wheels C are provided with cam-grooves $c^4$, in which rest plates $c^5$, carrying pins $c^6$. The plates $c^5$ are supported on the pins $c^7$, which are placed in such position on the hangers $b$ as to be opposite to slots $b^4$ in the gear-wheels $B^3$. The pins receive a reciprocating motion during the operation of the machine and the wheels C are so placed on their shafts that the pins $c^6$ are projected into one of the slots $b^4$ at the time when the pins $c^3$ are withdrawn from the slots $b^3$, serving to check the motion of the gear-wheels.

As additional means of checking the motion of the gear-wheels $B^3$, I provide the spring-seated pins $c^8$ with their outer ends rounded, these pins being designed to enter indentations in the inner face of the gear-wheels, placed in such position as to be opposite the pins $c^8$ when the impelling-pins are withdrawn.

The mechanism just described, constituting the stop device, is not herein specifically claimed, the same forming the subject-matter of another application for Letters Patent executed of even date herewith and filed December 18, 1891, Serial No. 415,520.

The loop-taker of the machine is designated by the letter E. It is preferably made in the form illustrated in the drawings, decreasing in thickness from a point near its center toward its circumference, where the thickness is so reduced as to present a small edge, and the periphery is provided with gear-teeth meshing with those of the gear-wheels $B^3$.

The loop-taker shown in Figs. 1 to 23 is shown as provided on opposite sides with openings $e$ $e^2$, extending inward from its periphery, which produce opposing hooks $e^3$ $e^3$ and holding and escape hooks $e^4$ $e^4$. Between each set of hooks is a space of sufficient width to permit the free entrance and escape of the thread. The openings $e$ $e^2$ are preferably formed, as shown, slanting inward from the periphery of the loop-taker, thereby producing the short hooks $e^3$ $e^3$, by which the loop of the needle-thread is engaged and the elongated retaining and escape hooks $e^4$ $e^4$, by which the loop is taken after passing approximately half-way around the loop-taker, retained and then released beneath the needle. Where the loop-taker has two peripheral openings forming two sets of hooks, the opposing hooks $e^3$ $e^3$ are about at diametrically-opposite points on the periphery, and the loop-taker must be stopped at the proper point in each half-revolution in order to cause it to complete a stitch and take up all slack; but in order not to have to stop the loop-taker this may have three or any further uneven number of peripheral openings, the loop-taker being properly timed with relation to the movement of the needle and the opposing hooks are then far from diametrically opposite.

Figure 24:
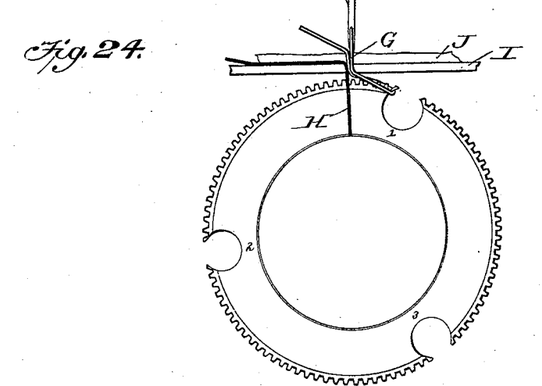
Figure 25:
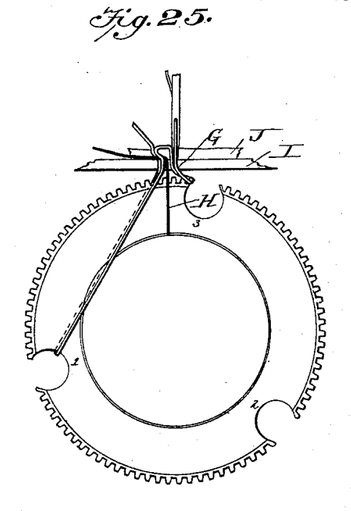
Figure 26:
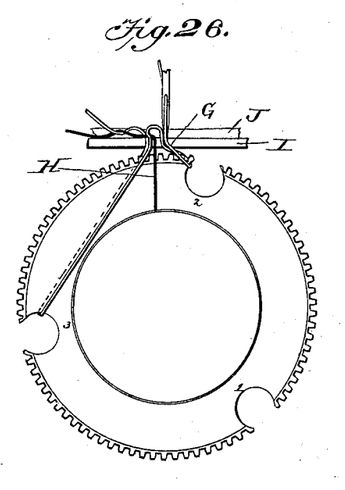

In Figs. 24 to 26 the shuttle shown is provided with three indentations forming three sets of hooks. The shuttle is supported in a circular raceway formed by the brackets $e^5$, attached to the frame of the machine, and between the brackets are left openings permitting the meshing of the gear-wheels $B^3$ with the gear-teeth on the periphery of the loop-taker. One side of the loop-taker is provided with a chamber $e^6$ for containing the lower thread of the machine when it is to be used to make a lock-stitch, and the thread carried on a spool, bobbin, or the like is confined in the chamber by a plate $e^7$ of a diameter slightly less than that of the opening in which it is to be placed, leaving an annular space around the plate for the passage of the lower thread.

To prevent too rapid feeding of the lower thread during the rapid operation of the machine and to keep the same uniform at all times, I provide a band $e^8$, of spring metal, having an opening at each end for the passage of the thread. This band is to be placed around the spool or bobbin and by its resiliency act as a tension on the thread, thereby regulating its outlet. This constitutes a tension device and is not herein claimed, the same forming the subject of another application for Letters Patent executed of even date herewith and filed December 15, 1891, Serial No. 415,177.

The feed of the machine is operated by the two cams F and $F^2$, placed on the driving-shaft of the machine. The cam F bears upon the lower end of a projecting arm $f^2$ of a bar $f$, which is pivoted to a stud $f^3$, attached to the lower face of the work-plate of the machine, and thus the bar $f$ is given an up-and-down motion as the shaft revolves. The bar $f$ bears upon the under side of a bar $f^4$, carrying the toothed portion $f^5$, the serrated parts of which project through slots in the work-plate of the machine. The bar $f^4$ is pivoted to and carried by a bar $f^6$, which is attached to the work-plate by a screw passing through the openings $f^{12}$. To the bar $f^6$ is attached a rod $f^7$, resting in a socket $f^8$ and has its lower end bearing upon the cam $F^2$, so that as the cam $F^2$ revolves a back-and-forth motion is imparted to the feed simultaneously with the rising motion imparted from cam F. A small spring $f^9$ is interposed between the plate $f^4$ and the work-plate of the machine and aids in returning the feed to its lower position after being raised in feeding. To return the feed to its normal position horizontally after each impulse, a helical spring $f^{10}$ is attached to the end of the bar $f^6$ and to a stud $f^{11}$ on the work-plate. The sockets $f^8$ are attached one on each side of the machine, and as the plate $f^6$ is attached to the work-plate by a screw which is easily removed the direction of feeding may quickly be changed by changing the bar $f^6$ and its appurtenances from one side of the plate to the other, according to the direction in which it is desired to feed.

The mechanism last described, constituting a reversible feed, is not herein specifically claimed by itself alone, the same forming the subject of another application for Letters Patent executed of even date herewith and filed December 18, 1891, Serial No. 415,519.

The machine herein described is capable of operation to form either a lock-stitch or a chain-stitch. The loop-taker being set to make one of these stitches, turning it around or over or reversing the motion of the driving-shaft will set it to make the other; but instead of reversing the loop-taker or reversing the driving the feed may be reversed.

Figures 1, 2:
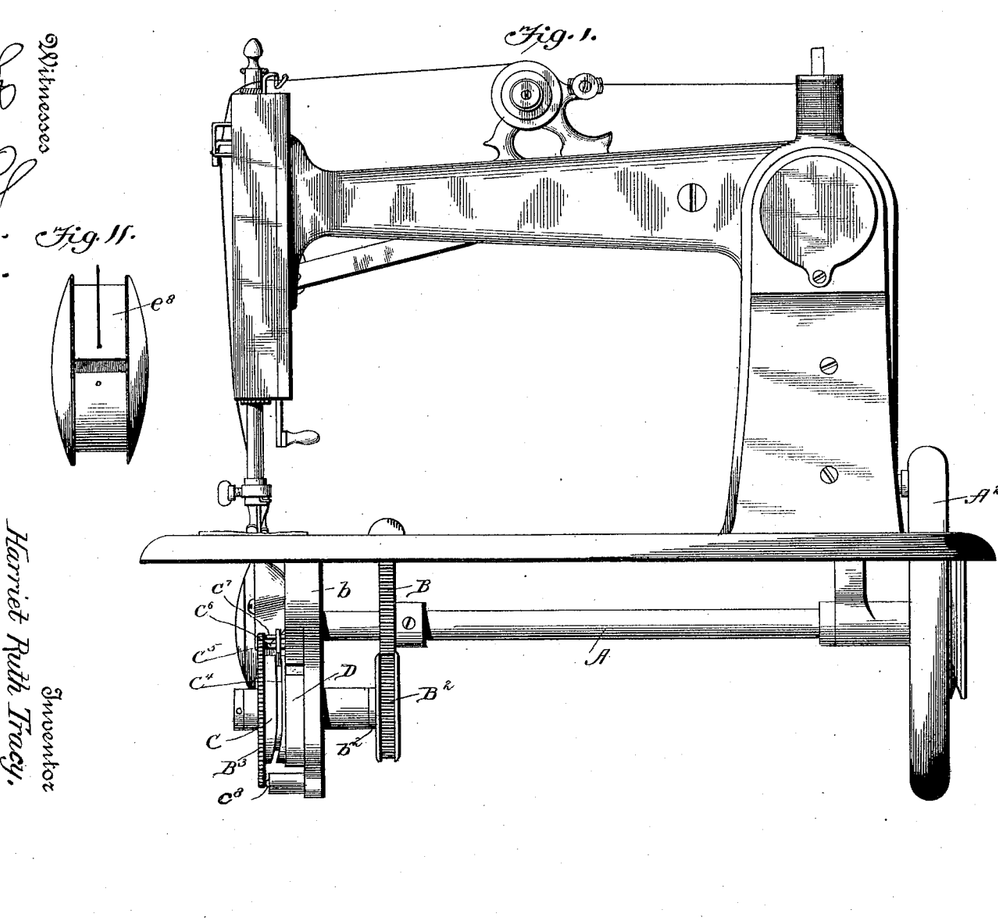
Figure 1 is a side elevation of a sewing-machine containing my invention.
Fig. 2 is an end elevation of the same.
Figure 2:
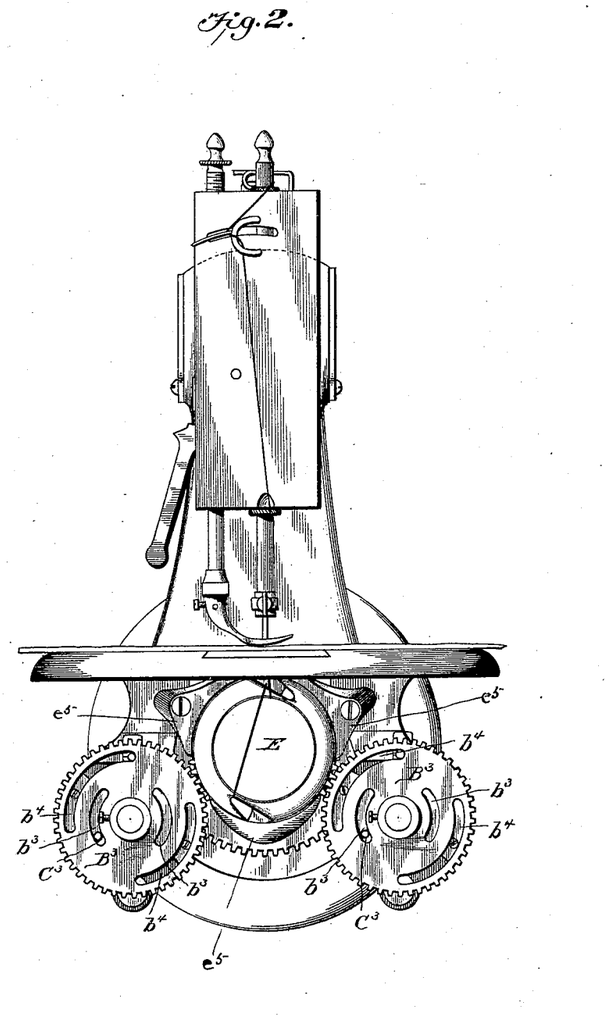
Figures 3, 4:
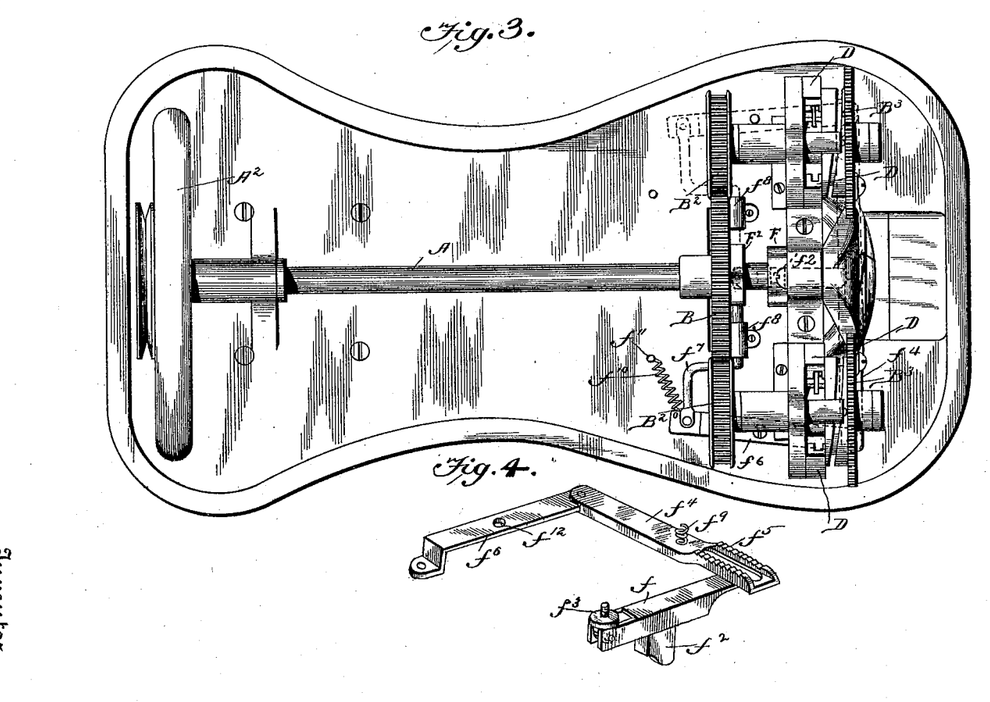
Fig. 3 is an inverted plan view with the reversible feed in position.
Fig. 4 is a perspective view showing the reversible feed separate.
Figure 5:
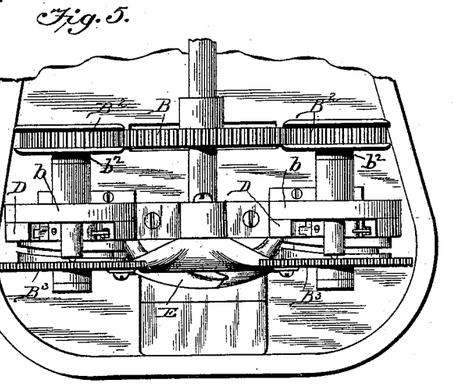
Fig. 5 is an inverted plan view showing a portion of the machine with the reversible feed removed.
Figure 6:
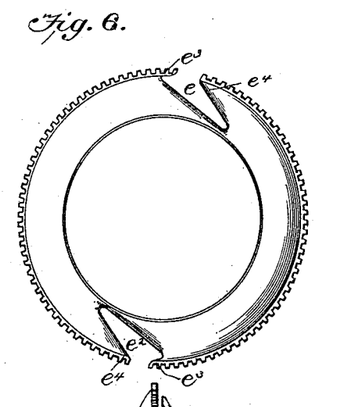
Fig. 6 is a side view of the inner face of the loop-taker.
Figure 7:
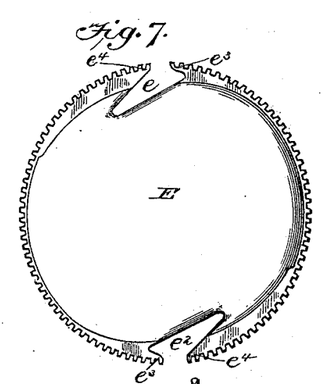
Fig. 7 is a side view of the outer face of the loop-taker.
Figure 8:
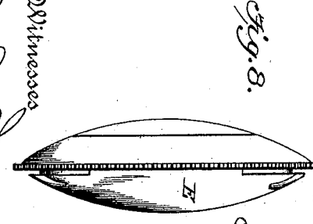
Fig. 8 is an end view of the loop-taker.
Figures 9, 10:
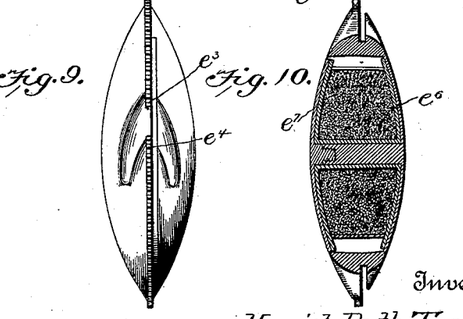
Fig. 9 is a similar view showing the loop-taker revolved ninety degrees from the position shown in Fig. 8.
Fig. 10 is a central vertical section of the loop-taker with a spool or bobbin of thread in it, the two together comprising a shuttle.
Figure 12:
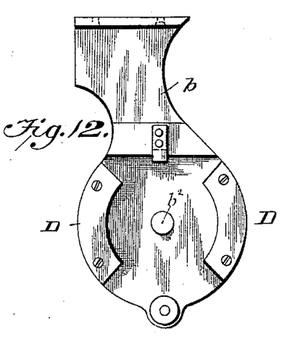
Fig. 12 is a detail view of a supporting device for the driving and stopping mechanism.
Figure 13:
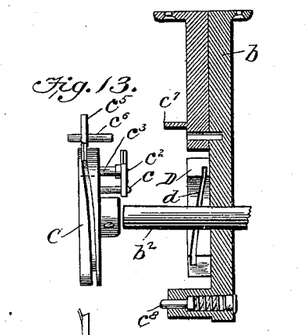
Fig. 13 is a view, partly in section, showing the means for accomplishing the stopping and starting of the shuttle.
Figure 14:
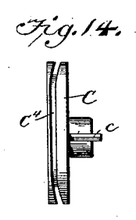
Fig. 14 is a view in side elevation of a wheel having a cam-groove, whereby the pins of the stopping mechanism are operated.
Figure 15:
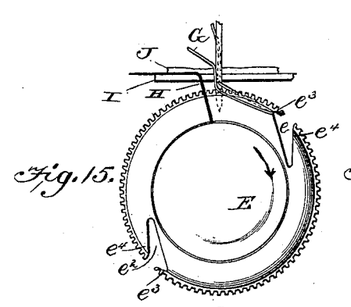
Fig. 15 is a detached view of the loop-taker and needle arranged to form a lock-stitch, showing the positions of the threads just after the needle-thread has been engaged by the loop-taker.
Figure 16:
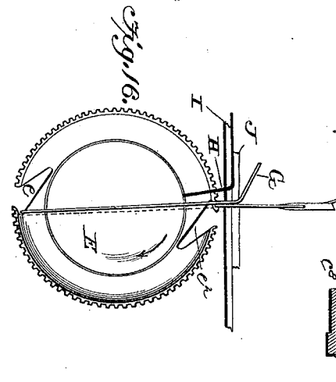
Fig. 16 is a view similar to Fig. 15, showing the positions of the thread when the first loop is drawn out to its fullest extent around the loop-taker and a second loop is to be taken.
Figure 17:
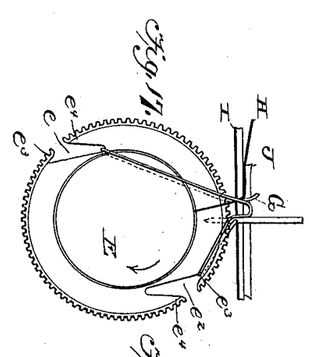
Fig. 17 is a view similar to Fig. 15, showing the second loop after being carried a short distance by the loop-taker and the first loop moving up to the shed.
Figure 18:
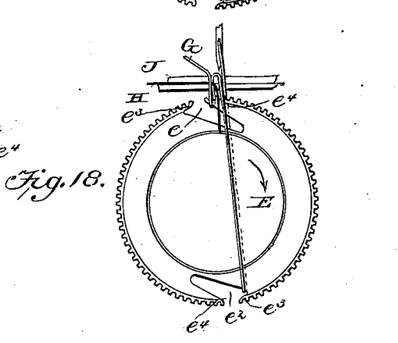
Fig. 18 is a view showing particularly the first loop when about to be released before being drawn up into the cloth.

In the drawings, Figs. 15 to 18 illustrate the operation of the loop-taker and needle in forming a lock-stitch when two sets of hooks are provided on the loop-taker. In Fig. 15 the needle-thread G is shown in the position assumed by it after having been engaged by one of the hooks $e^3$ and carried a short distance from the point of engagement, and the lower thread H is shown in the position in which it is placed preparatory to operating the machine, its free end being placed between the work-plate I and the cloth J. Fig. 16 represents the position assumed by the loop of the needle-thread G after having been carried approximately half-way around the loop-taker and spread out over the surface of the same. Fig. 17 represents the positions of the two threads after the second loop has been taken by the loop-taker and the same is being formed from the material of the loop, the thread having meantime been carried out through the cloth and the feed moved to advance the cloth the distance corresponding to the length of a stitch, and Fig. 18 represents the positions of the loops at the point when the first loop is about to be drawn up into the cloth and shed from the retaining-hook $e^4$, and the lower thread, which has been inclosed by the loop, is about to be drawn up into the cloth to complete the stitch.

In the formation of the lock-stitch by the machine, as herein described, it will be observed that each hook $e^3$ passes through the loop of the needle-thread formed by the advance of the hook $e^3$ before engaging the needle-thread to form a second loop, and in the formation of a lock-stitch the cloth is moved in the direction of the arrows in Figs. 15, 16, 17, and 18.

Figure 19:
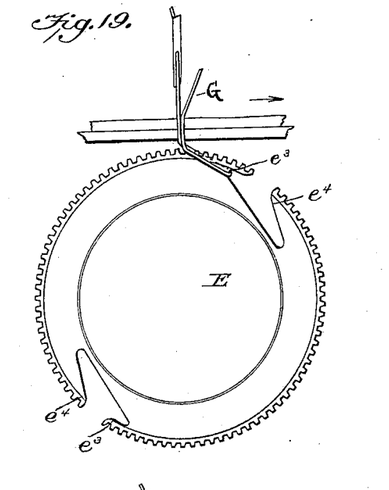
Figs. 19 to 23 illustrate the different positions assumed by the needle-thread in the formation of a chain-stitch made by my improved loop-taker and Figs. 24 to 26 illustrate the formation of a lock-stitch by a loop-taker provided with three sets of hooks.
Figure 20:
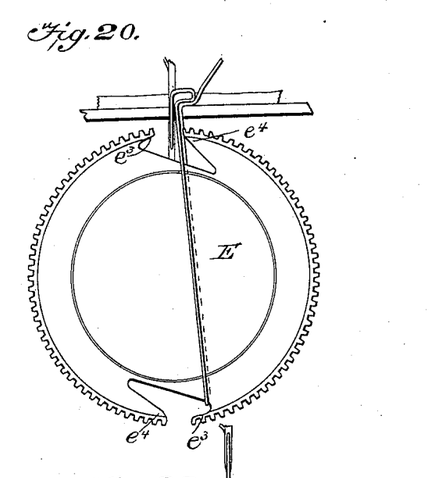
Figures 21, 22, 23:
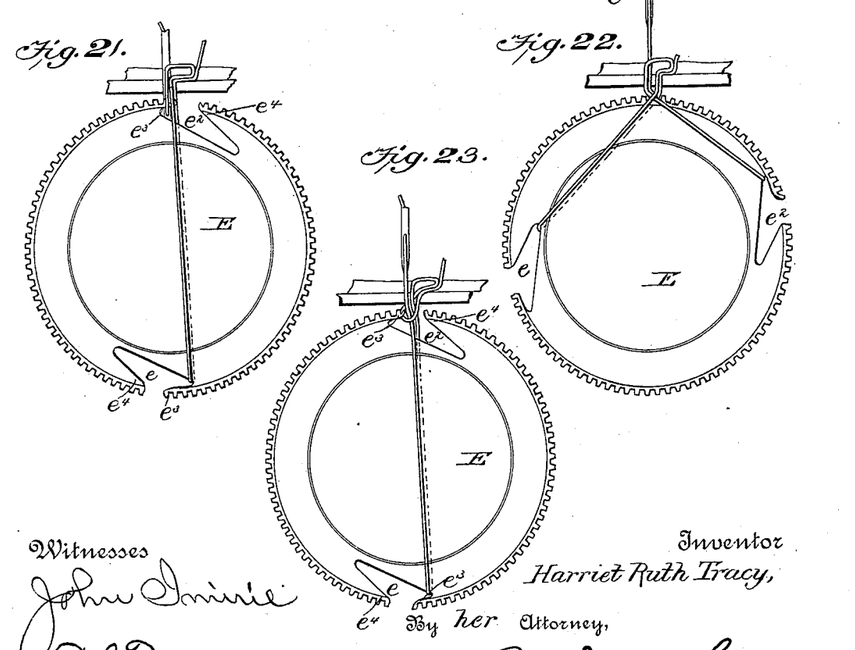

In the use of the loop-taker for the purpose of forming the ordinary chain-stitch the parts are arranged in such manner as to cause the cloth to feed in the direction of the arrows in Figs. 19, 20, 21, 22, and 23. In Fig. 19 the needle-thread G is shown as engaged by one of the hooks $e^3$ and as having been carried a short distance by the same. Fig. 20 illustrates the position of the loop after having been carried by the hook a distance approximately half-way around the loop-taker. Fig. 21 shows the loop-taker turned a short distance farther in its revolution than is shown in Fig. 20, the second hook $e^3$ just engaging the loop of the needle-thread and prior to the passage of this second hook through the first loop of the needle-thread. Fig. 22 shows the positions assumed by the loops after the loop-taker has been given about a quarter-turn from the position shown in Fig. 21, and Fig. 23 shows the first loop being drawn up to inclose the thread of the second loop and the needle in a position to descend to allow a third loop to be taken by one of the hooks $e^3$.

To insure a complete and accurate formation of the stitches, the machine is so arranged that when one of the retaining-hooks $e^4$ in the loop-taker with two peripheral openings has reached a position beneath the needle, where the loop is just about to be shed, the motion of the loop-taker is stopped until the needle comes down and rises, leaving its loop, and the loop is taken by the hook $e^3$ and the cloth is fed forward, thereby insuring the perfect drawing up of each completed loop.

A great advantage of the present invention is that the thread is taken up by pulling down through the work instead of pulling up and sawing through the needle-eye, and by the opposing hooks taking the loops in succession and passing it around the body of the loop-taker. This compensates with each loop, so that a very large loop may be formed; or, in other words, the shuttle may be large, so large as to take a large commercial spool or any other large supply of thread.

In Figs. 24, 25, and 26 is illustrated a form of loop-taker in which no stopping is necessary. In this form the periphery of the loop-taker is provided with three indentations arranged equidistant from each other and forming three sets of hooks instead of two, as previously illustrated. In a machine embodying this form of loop-taker the movements of the needle-bar are so timed that the loop-taker makes two-thirds of a revolution between each descent of the needle. The operation of this form of loop-taker is the same as that previously described, except in the matter of the order in which the loop-taking hooks operate. Where three sets of hooks are used, the order of engagement is: first set No. 1, then set No. 3, then set No. 2, then set No. 1, &c., each alternate set passing through the loop of the needle-thread carried by the next previous set without engagement. In the form having three sets of hooks it will be seen that a greater turning of the loop-taker is permitted between each descent of the needle, and it is found that the time allowed is amply sufficient to allow the accurate taking up of each completed loop between the operations of the needle.

The use of the loop-taker provided with three sets of hooks is herein illustrated in the formation of a lock-stitch; but it will be clear that by leaving out the lower thread and reversing the loop-taker, reversing the driving motion, or reversing the feed a chain-stitch may be formed.

While I have particularly herein described the use of two and three sets of hooks on each loop-taker, I do not, of course, wish to limit myself in this respect, as any desired number of sets of hooks may be employed, the number depending upon the speed at which it is desired to operate the machine, the character of the stitches to be formed, &c.

Having thus fully described my invention, what I claim as new, and desire to secure by Letters Patent, is—

1. A revoluble loop-taker provided with openings in its periphery forming opposing hooks, the openings to serve to retain the needle-thread upon the loop-taker for carriage of the loop of the needle-thread entirely around it and being of depth sufficient to keep the thread from contact with the driving-wheel, and the opposing hooks to serve to take and take up the thread, this loop-taker to be suitably supported and combined with a driving device having peripheral engagement with it, so that positive and accurately-timed movement may be given to the loop-taker, substantially as described.

2. A revoluble loop-taker provided with openings in its periphery forming opposing hooks, the openings to serve to retain the needle-thread upon the loop-taker for carriage of the loop of the needle-thread entirely around it and being of depth sufficient to keep the thread from contact with the driving-wheel, and the opposing hooks to serve to take and take up the thread, the loop-taker having a chamber for thread-supply supported and combined with a driving device having peripheral engagement with it, substantially as described.

3. The combination, with a revoluble loop-taker provided with openings in its periphery forming opposing hooks, the openings to serve to retain the needle-thread upon the loop-taker for carriage of the loop of the needle-thread entirely around it and being of depth sufficient to keep the thread from contact with the driving-wheel, and the opposing hooks to serve to take and take up the thread, of driving mechanism and a reversible feeding device whereby the fabric under operation may be moved in either of two directions, substantially as described.

In testimony whereof I affix my signature in presence of two witnesses.

HARRIET RUTH TRACY.

Witnesses:
R. G. DYRENFORTH,
E. H. PARRY.